(12) United States Patent
Ma

(10) Patent No.: US 7,402,624 B2
(45) Date of Patent: Jul. 22, 2008

(54) GRAFT COPOLYMERS WITH SEGMENTED ARMS AND THEIR PREPARATION AND USE

(75) Inventor: Sheau-Hwa Ma, West Chester, PA (US)

(73) Assignee: E.I. du Pont de Nemours & Company, Wilmington, DE (US)

( * ) Notice: Subject to any disclaimer, the term of this patent is extended or adjusted under 35 U.S.C. 154(b) by 320 days.

(21) Appl. No.: 10/983,540

(22) Filed: Nov. 8, 2004

(65) Prior Publication Data

US 2006/0100305 A1    May 11, 2006

(51) Int. Cl.
*C08F 290/02* (2006.01)

(52) U.S. Cl. .................. 524/504; 525/94; 525/170; 525/176; 525/221; 525/210; 525/211; 525/330.3

(58) Field of Classification Search .............. 524/504; 525/94, 170, 176, 221, 210, 211, 330.3, 902
See application file for complete search history.

(56) References Cited

U.S. PATENT DOCUMENTS

| | | | |
|---|---|---|---|
| 4,355,071 A | 10/1982 | Chang | |
| 4,442,269 A | 4/1984 | Sommerfeld et al. | |
| 4,680,352 A | 7/1987 | Janowicz et al. | |
| 4,722,984 A | 2/1988 | Janowicz | |
| 5,030,726 A | 7/1991 | Noriyuki et al. | |
| 5,045,616 A | 9/1991 | Rauterkus et al. | |
| 5,225,470 A | 7/1993 | Mancinelli | |
| 5,231,131 A | 7/1993 | Chu et al. | |
| 5,525,662 A | 6/1996 | Lavoie et al. | |
| 5,530,070 A | 6/1996 | Antonelli et al. | |
| 5,852,123 A | 12/1998 | Huybrechts | |
| 5,886,125 A | 3/1999 | Huybrechts | |
| 5,942,243 A | 8/1999 | Shah | |
| 6,117,958 A | 9/2000 | Ittel et al. | |
| 6,291,620 B1 | 9/2001 | Moad et al. | |
| 6,316,519 B1 | 11/2001 | Berge et al. | |
| 6,472,463 B1 | 10/2002 | Ma | |
| 6,555,619 B1 * | 4/2003 | Kennedy et al. | 525/100 |
| 6,569,969 B2 | 5/2003 | Charmot et al. | |
| 2005/0079442 A1 | 4/2005 | Dueber et al. | |
| 2006/0100350 A1 * | 5/2006 | Barsotti et al. | 524/543 |

FOREIGN PATENT DOCUMENTS

| | | |
|---|---|---|
| EP | 1 013 682 A1 | 6/2000 |
| EP | 1 396 504 A2 | 3/2004 |
| EP | 1 400 545 A2 | 3/2004 |
| GB | 2 413 330 A | 10/2005 |
| JP | 56 163183 | 12/1981 |
| JP | 2004/300413 | 10/2004 |
| WO | WO 95/21205 | 8/1995 |
| WO | WO 96/15158 | 5/1996 |
| WO | WO 03/046029 A1 | 6/2003 |

OTHER PUBLICATIONS

PCT International Search Report for International Application No. PCT/US2005/040459 dated Aug. 18, 2006 with Written Opinion of the International Searching Authority.

* cited by examiner

*Primary Examiner*—Randy Gulakowski
*Assistant Examiner*—Olga Asinovsky
(74) *Attorney, Agent, or Firm*—Kevin S. Dobson

(57) ABSTRACT

Graft copolymers with segmented (or block) arms and a process for preparing the same. Such polymers are particularly useful in formulating air-dry clear coat and color coat lacquers used in automotive refinishing.

22 Claims, No Drawings

GRAFT COPOLYMERS WITH SEGMENTED ARMS AND THEIR PREPARATION AND USE

FIELD OF THE INVENTION

The present invention relates to graft copolymers, and in particular to graft copolymers bearing segmented arms useful in formulating coatings, particularly fast-drying coatings used in automotive refinishing, and a process for preparing the same.

BACKGROUND OF THE INVENTION

To refinish or repair a finish on vehicle, such as a colorcoat/clearcoat finish on automobile or truck bodies, different fast-drying coating compositions have been developed. A number of pigmented and clear air-dry acrylic lacquers have been used in the past to repair or refinish a colorcoat/clearcoat finish, but none meet the rapid drying times that are desired in combination with outstanding physical properties, such as chip and humidity resistance and adhesion.

A key concern to a refinish customer which is typically the vehicle owner is that the coating in use has excellent physical properties such as chip and humidity resistance, and adhesion, as well as excellent aesthetic appearance.

Another key concern of the automobile and truck refinish industry is productivity, i.e., the ability to complete an entire refinish operation in the least amount of time. To accomplish a high level of productivity, any coatings applied need to have the ability to dry at ambient conditions in a relatively short period of time. The term "dry" means that the resulting finish is physically dry to the touch in a relatively short period of time to minimize dirt pick-up, and, in the case of the basecoat, to allow for the application of the subsequent clear coat.

Therefore, a seemingly small improvement in any one of the forgoing properties can translate into substantial improvements in productivity and quality of the repair job. Accordingly, the development of a new product that can improve the productivity and/or performance requirements of coatings used in automotive refinishing would be a great contribution to the art.

SUMMARY OF THE INVENTION

A composition that can be used as a film-forming component in coating formulations is provided which is a graft copolymer with one or more segmented arms. The graft copolymer more particularly has a weight average molecular weight of about 5,000-200,000, and has a polymeric backbone and segmented side chain(s) or so-called segmented arm(s) formed of at least two different polymeric segments, grafted onto the backbone, wherein (a) the backbone is of polymerized ethylenically unsaturated monomers; and (b) the segmented arm(s) are of polymerized ethylenically unsaturated monomers that are attached to the backbone via a single point, and the segments on each arm are of substantially differing composition from their adjacent segment(s) and are incorporated therein in a non-random manner.

In one embodiment, the arm(s) are comprised of segmented macromonomer(s) that are polymerized into the backbone via a single terminal ethylenically unsaturated group.

To provide unique properties, the segments of the arms may differ in the following ways: types of interactive or reactive functional groups for network formation; concentration of functional groups; solubility; polarity; hydrogen-bonding capability; hardness; and/or size or length of each segment. In addition, the backbone may be the same or similar to one of the segments on the arms or be entirely different.

The polymerization process for producing graft copolymers with segmented arms and coating compositions comprising such graft copolymers are also part of this invention.

The graft copolymers are particularly useful as a film-forming binder component in an auto refinish clearcoat or colorcoat lacquer.

DETAILED DESCRIPTION OF THE INVENTION

The present invention provides graft copolymers having a specific polymer structure that can be used as a film-forming component in fast drying coating formulations, especially pigmented and clear air-dry acrylic lacquers useful in automotive refinishing. A process for producing such graft copolymers and coating compositions comprising such graft copolymers are also part of this invention.

Advantageously, air-dry acrylic lacquer coating compositions formed using the forgoing polymers dry very rapidly at ambient temperatures and have exceptional physical properties, such as chip and humidity resistance and adhesion, without sacrifice in either ease of applying the coating or ultimate quality of the finish. Thus, these coatings are highly useful for repairing a colorcoat/clearcoat finish of a vehicle using the coating composition as either or both a refinish colorcoat and refinish clearcoat, which greatly improves the quality and productivity of a refinish operation by allowing more vehicles to be processed in the same or less time.

More particularly, the present invention discloses graft copolymers with segmented arms, in which the composition of each of the arm segments is different from their adjacent segment(s) to provide the unique properties desired. Each arm has at least two segments formed thereon. In addition, the backbone may be the same or similar to one of the segments on the arms or entirely different. The arm segments and the backbone may differ in one or more of the following ways.

(1) Type of functional groups (a) Interactive or reactive non-ionic groups for network formation Primary hydroxyl Secondary hydroxyl Primary amine Secondary amine Tertiary amine Carboxylic acid Sulfonic acid Phosphoric acid Epoxy Silane Isocyanate Acetoacetate Aromatic (b) Low surface energy groups Perfluoroalkyl Siloxane Polysiloxane (c) Interactive or reactive groups for enhancing interactions with a solid surface Heterocyclic (2) Concentration of functional groups (3) Solubility Hydrophilic groups Hydrophobic groups (4) Polarity
(5) H-bonding capability
Hydroxyl
Carboxylic acid
Ethylene oxide
Amide
Urea
(6) Size or length of each segment
(7) Tg (i.e., hardness) of each segment.

As indicated above, each arm has at least two segments formed thereon. In one embodiment, the segments are produced using a macromonomer approach, whereby a macromonomer having a segmented structure is grafted onto a polymeric backbone via a single terminal point, preferably via a single terminal ethylenically unsaturated group.

The macromonomer, having the segmented structure and only one terminal ethylenically unsaturated group (or vinyl terminal group), is typically prepared first. It is then copolymerized with ethylenically unsaturated monomers chosen for the backbone composition to form the graft structure.

In the above embodiment, the macromonomer arm is essentially formed like a block copolymer in that it contains at least two polymeric segments A and B of differing composition, to form the individual segments on the arms. Each segment is formed from different ethylenically unsaturated monomers or monomer mixtures. The outer segment (or segment A) of the segmented arms is prepared first as a macromonomer which has only one terminal ethylenically unsaturated group. The second segment B (which forms the inner segment in this example, or segment closest to the backbone) is then built on the segment A to produce a segmented arm which is also a macromonomer having only one terminal ethylenically unsaturated group which is eventually polymerized into the backbone of the graft copolymer. Of course, additional segments may be added to the B segment until the desired number of segments are formed before the macromonomer is finally attached to the backbone. By "inner" and "outer" segments, it is meant the arm segments closest to and farthest from the backbone, respectively.

Also, as used herein, "macromonomer having a segmented structure or architecture" refers to a macromonomer having only one terminal polymerizable double bond and comprising at least two polymeric segments of differing compositions; having any one of a number of different architectures where the monomers are not incorporated into the polymer architecture in a solely statistical or uncontrolled manner. Although there may be only a few monomers in a single segment, it will still be referred to herein as a macromonomer with a segmented architecture. In some embodiments, the macromonomer will have an A-B architecture (with "A" and "B" representing the monomers or monomer mixtures). Other architectures included within the definition are A-B-A, A-B-A-B, A-B-C, A-B-C-A, A-B-C-A-B, A-B-C-B, A-B-A-C (with "C" representing a third monomer or monomer mixture), and other combinations that will be obvious to those of skill in the art.

A "segment" within the scope of the above definition typically comprises about 3 or more monomers of a single selected mixture. In preferred embodiments, the number of monomers within a single segment is about 10 or more, about 20 or more or about 50 or more. However, in an alternative embodiment, the macromonomers of this invention include segments where a segment is defined as one or more monomers that are not represented elsewhere in the macromonomer. This definition is intended to encompass adding small amounts of a special functionalized monomer at one or both ends of a regular macromonomer or a well-defined segmented macromonomer. In this alternative embodiment, the same copolymer architectures discussed above apply. This definition is therefore intended to include telechelic macromonomers, which include one or more functional end groups (other than the radically polymerizable end group) capable of reacting or interacting with other molecules. The functional groups present at one or both ends of a telechelic arm may be those known to those of skill in the art, including, for example, epoxy, hydroxy, carboxylic acid or carboxylate, amine and the like, which have the ability to associate or form bonds with another molecule and which are also compatible with free radical polymerization.

Combining the above embodiments provides a particularly powerful method of designing macromonomers. For example, a macromonomer may have the architecture F-A-B or A-B-F (where F represents a functional group attached to the assigned segment). The macromonomer may also have the architecture F-A-B-F, where F represents functional groups that may be the same or different within a single F-A-B-F structure (which, therefore, may encompass F-A-B-F'). Other architectures will be apparent to those of skill in the art upon review of this specification.

These segmented macromonomer arms can be prepared by a number of ways, including sequential addition of different monomers or monomer mixtures to living polymerization reactions such as anionic polymerization, group transfer polymerization, nitroxide-mediated free radical polymerization, atom transfer radical polymerization (ATRP) or reversible addition-fragmentation chain transfer (RAFT) polymerization, and finally converting the living end to a terminal polymerizable double bond, or by sequentially building one segment at a time using catalytic chain transfer agents as described below.

The catalytic chain transfer agent approach is our preferred method for making the segmented macromonomers of this invention. The other living polymerization approaches mentioned above often involve special and costly raw materials including special initiating systems and high purity monomers. Some of them have to be carried out under extreme conditions such as low moisture or low temperature. In addition, some of the initiating systems bring undesirable color, odor, metal complexes, or potentially corrosive halides into the product. Extra steps would be required to remove them. In our preferred method, the catalyst is used at extremely low concentration and have minimum impact on the quality of the product, and the synthesis can be conveniently accomplished in a one-pot process.

In the catalytic chain transfer agent approach, the segmented macromonomers are most conveniently prepared by a multi-step free radical polymerization process to ensure that the resulting segmented macromonomer only has one terminal ethylenically unsaturated group which will polymerize with the backbone monomers to form the graft copolymer. Such a process is taught, for example in U.S. Pat. No. 6,291,620 to Moad et al, hereby incorporated by reference in its entirety. In the first step of the process, the first or outer segment of the macromonomer is formed using a free radical polymerization method wherein ethylenically unsaturated monomers or monomer mixtures chosen for this segment are polymerized in the presence of cobalt catalytic chain transfer agents or other transfer agents that are capable of terminating the free radical polymer chain and forming a terminal polymerizable double bond in the process. The polymerization is preferably carried out in an organic solvent or solvent blend using a conventional free radical initiator and Co (II) or (III) chain transfer agent.

Once the first macromonomer segment having the desired molecular weight and conversion is formed, the cobalt chain transfer agent is deactivated by adding a small amount of oxidizing agent such as hydroperoxide. The unsaturated monomers or monomer mixtures chosen for the next segment are then polymerized in the presence of the first segment and more initiator. This step, which can be referred to as a macromonomer step-growth process, is likewise carried out in an organic solvent or solvent blend using a conventional polymerization initiator. Polymerization is continued until a macromonomer is formed of the desired molecular weight and desired conversion of the second segment into a two-segmented arm.

This latter growth step can be repeated using different monomers or mixture of monomers until the desired number of segments on the arms is formed. The final segment that is formed by the above process will have attached thereto a single terminal ethylenically unsaturated group which will be used to attach the macromonomer to the polymer backbone.

Preferred cobalt chain transfer agents are described in U.S. Pat. No. 4,680,352 to Janowicz et al and U.S. Pat. No. 4,722,984 to Janowicz, hereby incorporated by reference in their entirety. Most preferred cobalt chain transfer agents are pentacyano cobaltate (II), diaquabis(borondiflurodimethylglyoximato)cobaltate(II), and diaquabis(borondifluorophenylglyoximato)cobaltate(II). Typically these chain transfer agents are used at concentrations of about 2-5000 ppm based on the total weight of the monomer depending upon the particular monomers being polymerized and the desired molecular weight. By using such concentrations, macromonomers having the desired molecular weight can be conveniently prepared.

To make distinct arm segments (or blocks), the growth of each segment need to occur to high conversion. Conversions are determined by size exclusion chromatography (SEC) via integration of polymer to monomer peak. For UV detection, the polymer response factor must be determined for each polymer/monomer polymerization mixture. Typical conversions can be 50% to 100% for each block. Intermediate conversion can lead to block copolymers with a transitioning (or tapering) block where the monomer composition gradually changes to that of the following block as the addition of the monomer or monomer mixture of the next block continues. This may affect polymer properties such as phase separation, thermal behavior and mechanical modulus and can be intentionally exploited to drive properties for specific applications. This may be achieved by intentionally terminating the polymerization when a desired level of conversion (e.g., >80%) is reached by stopping the addition of the initiators or immediately starting the addition of the monomer or monomer mixture of the next block along with the initiator.

After the macromonomer is formed as described above, solvent is optionally stripped off and the backbone monomers are added to the macromonomer along with additional solvent and polymerization initiator, in order to prepare the graft copolymer structure by conventional free radical polymerization methods. The backbone monomers are copolymerized with the macromonomers via the single terminal unsaturated group of the macromonomer using any of the conventional azo or peroxide type initiators and organic solvents as described below. The backbone so formed contains polymerized ethylenically unsaturated monomers and any of the monomers including those with functional groups listed below for use in the macromonomer.

Polymerization is generally continued in the same pot at the reflux temperature of the reaction mixture until a graft copolymer is formed having the desired molecular weight.

An alternative method for preparing the graft copolymer of this invention involves reversing some of the steps. The backbone with a desired composition and molecular weight and having a proper concentration of some functional groups that are capable of initiating a living polymerization process or some precursor groups that may be converted to such initiating groups may be synthesized first. Off of these initiating groups, arms of desired segmented structure may be built in a sequential manner by a living polymerization process. As an example, a proper level of 4-(alpha-bromomethyl) styrene may be copolymerized into a backbone composition. Then an atom transfer radical polymerization (ATRP) process may be used to build the segments from the benzyl bromide groups to form the segmented arms of this invention. Another example of an alternative method include synthesizing a segmented copolymer (arms) using one of the living polymerization processes mentioned above and terminating the polymer chain with a reactive group such as carboxylic acid first. The segmented arms are then grafted onto a backbone polymer having a coreactive group such as epoxy. The segmented arms are attached to the backbone through an ester linkage.

Typical solvents that can be used to form the macromonomer or the graft copolymer are alcohols, such as methanol, ethanol, n-propanol, and isopropanol; ketones, such as acetone, butanone, pentanone, and hexanone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers such as cellosolves and carbitols; and, glycols such as ethylene glycol and propylene glycol; and mixtures thereof.

Any of the commonly used azo or peroxide type polymerization initiators can be used for preparation of the macromonomer or graft copolymer provided it has solubility in the solution of the solvents and the monomer mixture, and has an appropriate half life at the temperature of polymerization. "Appropriate half life" as used herein is a half-life of about 10 minutes to 4 hours. Most preferred are azo type initiators such as 2,2'-azobis(isobutyronitrile), 2,2'-azobis(2,4-dimethylvaleronitrile), 2,2'-azobis(methylbutyronitrile), and 1,1'-azobis(cyanocyclohexane). Examples of peroxy based initiators are benzoyl peroxide, lauroyl peroxide, t-butyl peroxypivalate, t-butyl peroctoate which may also be used provided they do not adversely react with the chain transfer agents under the reaction conditions for macromonomers.

Generally, monomers that may be polymerized using the methods of this invention include at least one monomer selected from the group consisting of unsubstituted or substituted alkyl acrylate, alkyl methacrylate, cycloaliphatic acrylate, cycloaliphatic methacrylate, aryl acrylate, aryl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, vinyl aromatics, and combinations thereof. Functionalized versions of these monomers and their relative concentrations are especially useful in differentiating the segments of the arms and the backbone, as will be discussed further hereinbelow.

Specific monomers or comonomers that have no special functional groups and may be used in this invention include methyl methacrylate, ethyl methacrylate, propyl methacrylate (all isomers), butyl methacrylate (all isomers), 2-ethylhexyl methacrylate, isobornyl methacrylate, methacrylonitrile, methyl acrylate, ethyl acrylate, propyl acrylate (all isomers), butyl acrylate (all isomers), 2-ethylhexyl acrylate, isobornyl acrylate, acrylonitrile, etc.

As for functional groups, both primary and secondary hydroxyl groups are commonly included in crosslinkable polymers. Secondary hydroxyl group in general has a lower reactivity towards crosslinking agents such polyisocyanates. Examples of useful monomers for this purpose include 2-hydroxyethyl methacrylate (primary), hydroxypropyl methacrylate (all isomers, primary and secondary), hydroxybutyl methacrylate (all isomers, primary and secondary), 2-hydroxyethyl acrylate (primary), hydroxypropyl acrylate (all isomers, primary and secondary), hydroxybutyl acrylate (all isomers, primary and secondary), and the like.

Examples of monomers having amine functional group include N,N-dimethylaminoethyl methacrylate (tertiary amine), N,N-diethylaminoethyl methacrylate (tertiary amine), N,N-dimethylaminoethyl acrylate (tertiary amine), N,N-diethylaminoethyl acrylate (tertiary amine), N-t-butylaminoethyl methacrylate (secondary amine), N-t-butylaminoethyl acrylate (secondary amine), 2-aminoethyl methacrylate hydrochloride (primary amine), N-morpholinoethyl methacrylate (tertiary amine), N-morpholinoethyl acrylate (tertiary amine), 2-vinyl pyridine (tertiary amine), 4-vinyl pyridine (tertiary amine), diethylaminostyrene (all isomers), diethylamino alpha-methylstyrene (all isomers), and the like.

The most commonly used carboxyl group containing monomers are methacrylic acid and acrylic acid. Others include vinyl benzoic acid (all isomers), alpha-methylvinyl benzoic acid (all isomers), and the diacids such as maleic acid, fumaric acid, itoconic acid, and their anhydride form that can be hydrolyzed to the carboxylic acid groups after the polymers are made.

Sulfonic acid groups can be derived from the following examples of monomers: 2-sulfoethyl methacrylate, 3-sulfopropyl methacrylate, (3-sulfopropyl) dimethyl(3-methacrylamidopropyl) ammonium inner salt), 4-styrene sulfonic acid, and the like.

To directly introduce a phosphonic acid group, vinyl phosphonic acid monomer can be used. Alternatively, a monomer having hydroxyl group or epoxy group may be converted to the phosphonic acid group by reacting it with a phophorylating agent such as $POCl_3$, polyphosphoric acid, preferably $P_2O_5$.

For epoxy functional groups, the most commonly used monomer is glycidyl methacrylate. Other examples include glycidyl acrylate and any acrylic monomers having hydroxyl group that can be reacted with epichlorohydrin to produce the epoxy group.

Examples of monomers having self-crosslinkable silane group include but are not limited to trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, and the like.

Examples of monomers that can be conveniently used to incorporate isocyanate groups into the polymers of this invention include 2-isocyanatoethyl methacrylate, m-isopropenyl-α,α-dimethylbenzyl isocyanate (m-TMI), and the like.

A preferred acetoacetate functional monomer that is useful for introduction of acetoacetate functionality into the graft copolymer of this invention is acetoacetoxyethyl methacrylate. Examples of other monomers that can be used to introduce acetoacetate functionality include acetoacetoxyethyl acrylate, allyl acetoacetate, acetoacetoxybutyl methacrylate, acetoacetoxybutyl acrylate, and the like. In general, any polymerizable hydroxy functional monomer can be converted to the corresponding acetoacetate monomer by reaction with diketene or other suitable acetoacetating agents. Alternatively, the hydroxy groups may be selectively built onto the polymer, either on the backbone and/or in the selected segment(s) on the arms, through the use of hydroxy containing monomers. They are subsequently treated with acetoacetating agent such as t-butyl acetoacetate at elevated temperature and converted to the acetoacetate groups on the polymers of this invention.

For ethylene oxide group, the following monomers are commercially available: alkoxy (C1-C10) polyethyleneglycol (Mw 100-2000) methacrylate, polyethyleneglycol (Mw 100-2000) monomethacrylate, alkoxy (C1-C10) polyethyleneglycol (Mw 100-2000) acrylate, polyethyleneglycol (Mw 100-2000) monoacrylate, ethoxyethyl methacrylate, ethoxytriethyleneglycol methacrylate, ethoxyethyl acrylate, 2-(2-ethoxyethoxy)ethyl acrylate, and the like.

Amide and substituted amide groups are polar and capable of forming hydrogen bonds. Examples of monomers of this type include methacrylamide, N-methylacrylamide, N-tert-butylmethacrylamide, N-n-butylmethacrylamide, N-tert-butylacrylamide, N-n-butylacrylamide, and crosslinkable N-methylolmethacrylamide, N-ethylolmethacrylamide, N-methylolacrylamide, and N-ethylolacrylamide, and the like. Cyclic amides can also be used. An example is N-vinyl-2-pyrrolidinone.

Useful examples of urea group containing monomers which are also capable of forming hydrogen bonds include the ethylenically unsaturated urea containing monomers described in U.S. Pat. Nos. 5,030,726 and 5,045,616, hereby incorporated by reference. Preferred monomers are the acrylate, methacrylate, acrylamide or methacrylamide derivatives of 2-hydroxyethylene urea (HEEU), or 2-aminoethylethylene urea (AEEU). The most preferred monomers of this type that are commercially available include N-(2-methacryloyloxyethyl)ethylene urea and methacrylamidoethylethylene urea. Other examples of urea containing monomers can be obtained by reacting an ethylenically unsaturated monomer having an isocyanato group such as dimethyl m-isopropenylbenzyl isocyanate (m-TMI) or 2-isocyanatoethyl methacrylate (ICEMA) with a hydroxyl or amino compound having a linear or a cyclic urea group such as HEEU or AEEU. In these examples the urea group is linked to the monomer through a urethane or another urea group. Vinyl ureas can also be used.

To introduce aromatic functionalities, the following monomers can be conveniently used: styrene, alpha-methyl styrene, phenyl methacrylate, phenyl acrylate, benzyl methacrylate, benzyl acrylate, 2-phenoxyethyl methacrylate, 2-phenoxyethyl acrylate, 2-naphthayl methacrylate, 2-naphthyl acrylate, p-nitrophenyl methacrylate, p-nitrophenyl acrylate, and the like.

Special groups such as a fluorinated hydrocarbon, a siloxane, a polysiloxane, an alkylsiloxane, an ethoxylated trimethylsilyl siloxane, and a propoxylated trimethylsilyl siloxane, when incorporated in a polymer of this invention can have a surface tension lowering effect. Typically useful perfluoroalkyl containing monomers are perfluoromethylethyl methacrylate, perfluoroethylethyl methacrylate, perfluorobutylethyl methacrylate, perfluoropentylethyl methacrylate, perfluorohexylethyl methacrylate, perfluorooctylethyl methacrylate, perfluorolaurylethyl methacrylate, perfluorostearylethyl methacrylate, perfluoromethylethyl acrylate, perfluoroethylethyl acrylate, perfluorobutylethyl acrylate, perfluoropenylethyl acrylate, perfluorohexylethyl acrylate, perfluorooctylethyl acrylate, perfluorolaurylethyl acrylate, perfluorostearylethyl acrylate, trifluoromethylbenzyl methacrylate, trifluoromehtylbenzyl acrylate, 1,1,1-trifluoropropylbenzyl methacrylate, 1,1,1-trifluoropropylbenzyl acrylate, and the like. Typically used are perfluoroalkyl ethyl methacrylate wherein the fluoroalkyl group contains 4-20 carbons, and benzyl ether acrylates and methacrylate of Zonyl® FTS fluorotelomer intermediate. Zonyl® FTS is commercially available $C_9$-$C_{10}$ fluorinated alcohol from DuPont Co. Typically useful examples of siloxane containing monomers include (meth)acryloxyalkyl terminated polydimethylsiloxanes such as MCR-M11 and MCR-M17 available from Gelest, Inc., Tullytown, Pa., and X-22-174DX and X-22-2426 available from Shin-Etsu Chemical Co., Ltd., Tokyo, Japan.

The "heterocyclic" group in this invention refers to any cyclic or polycyclic structure having at least one heteroatom such as O, N, and S on the cycle(s). Examples of such groups include pyridyl, furyl, pyrrolyl, thienyl, imidazolyl, pyrazolyl, pyrazinyl, pyrimidinyl, pyridazinyl, pyranyl and indolyl. Monomers having these groups may be used directly. Examples include 2-vinyl pyridine, 4-vinyl pyridine, 2-vinyl pyrrole, 3-vinyl pyrrole, 2-vinyl oxazole, 4-vinyl oxazole, 2-vinyl thiazole, 4-vinyl thiazole, 2-vinyl imidazole, 4-vinyl imidazole, 3-vinyl pyrazole, 3-vinyl pyridazine, 4-vinyl pyridazine, 3-vinyl isoxazole, 3-vinyl isothiazole, 2-vinyl pyrimidine, 4-vinyl pyrimidine, and 5-vinyl pyrimidine. Alternatively, the heterocyclic groups may be added through some reactive groups such epoxide after the polymer is prepared.

Some of the above monomers may have additional properties that can be used to differentiate the segments of the arms and the backbone. For example, the vinyl aromatics are very hydrophobic. The alkyl and cycloalkyl acrylates and methacrylates with greater than 6 carbon atoms in the alkyl group are also hydrophobic. Hydrophilic monomers include hydroxyl-containing monomers, carboxyl-containing monomers and ethylene oxide containing monomers, as well as the amides and urea containing monomers mentioned above. These monomers are also capable of hydrogen bonding with water. High Tg monomers which can be used to form relatively hard polymer segments include isobornyl acrylates, cyclohexyl methacrylates, methyl methacrylate, and t-butyl styrene.

In accordance with the forgoing, the graft copolymer of this invention may be put together in a number of ways. For example, in some embodiments of the graft copolymer of this invention, a combination of hydrophobic monomers (e.g., styrene, butyl methacrylate) and hydrophilic monomers (e.g., methacrylic acid) may be used in two separate arm segments. Likewise, a combination of functional monomers (e.g., 2-hydroxylethyl methacrylate) and non functional monomers (e.g., methyl methacrylate, isobornyl methacrylate) can be used in the two separate segments. In other embodiments, a combination of high Tg (e.g., methyl methacrylate and styrene) and low Tg monomers (e.g., butyl acrylate) may be used to form an arm with a hard and soft segment.

Segmented arms on the graft copolymer accordingly allow the combination of potentially diverse polymer properties (such as hard/soft and/or hydrophilic/hydrophobic (amphiphilic) and/or functional/nonfunctional blocks) into a single polymer chain. Hard/soft copolymer arms combine segments with significantly different glass transition temperatures Tg. A typical hard/soft copolymer pairs a relatively "hard" block (e.g., methyl methacrylate and styrene) with a relatively "soft" block (e.g., butyl acrylate). The resulting materials can possess performance attributes not found in any of the constituent segments. For example, by combining the stiffness or rigidity characteristic of hard materials with the compliance of soft materials, graft copolymers of this invention may exhibit advantageous properties, such as toughening of the coating or improving drying properties and metallic flake orientation in air-dry lacquer coatings. Crosslinkable groups, such as hydroxyl groups, can also be placed in an outer soft segment attached to a hard inner segment to improve the reactivity of the graft copolymer with other binder components in crosslinkable coating compositions.

The exact properties of a hard/soft copolymer depend significantly on the difference between the glass transition temperatures of the constituent blocks; accordingly, selection of monomers having glass transition temperatures a particular distance apart can lead to hard/soft segmented copolymers having particular desired characteristics. Thus, while for one application it may be appropriate to combine segments having glass transition temperatures that differ by, for example, 20° C., the choice of Tg (and therefore of materials) depends on the application.

In other embodiments, different reactive functional groups can be placed in different segments to provide unique properties. For example, in crosslinkable coatings, by having different functional groups which will react with crosslinkers at different rates at selected locations or segments, the curing profile versus time and temperature may be controlled to suit the application needs. The crosslinking points, the crosslinking density and the entire network formation are also better controlled for film properties of the finished coating product. Still in another embodiment, it may be desirable to place crosslinkable groups on the outer ends of the arms using just a few monomers. With crosslinkable groups concentrated at the ends of the arms where the crosslinking reactions can take place and build network most effectively, the overall concentration of the crosslinkable groups required can be reduced. The amount of crosslinkers required is also reduced to give a coating system at a lower cost.

In another embodiment of this invention, a combination of hydrophilic and hydrophobic monomers may be placed in separate segments of the arms to provide an amphiphilic arm. Such amphiphilic arms produced according to the invention display combinations of hydrophobic and hydrophilic properties that make such materials appropriate for use in either solvent borne or water borne coatings depending on the polymer designs. With hydrophilic groups on the outer segment and the hydrophobic groups in the inner segment and the backbone, high molecular weight polymers may be dispersed in aqueous media to give a low viscosity for handling. Or, in reverse, a high molecular weight polymer having hydrophilic groups may be dispersed or stabilized with hydrophobic groups on the outer segments of the arms in a nonpolar solvent. By concentrating the stabilizing groups at the desired location, fewer groups are needed.

In other embodiments, association of the interactive groups at the outer segment of a graft copolymer of this invention will lead to formation of a reversible network that is connected by physical forces and is sensitive to shear force, temperature, or pH. This type of system may be useful for their Theological properties such as the thixotropic behavior to prevent the paint from sagging. Groups capable of hydrogen bonding or ionic interactions may be advantageously employed for this purpose.

The ionic groups such as the quaternary ammonium are not desired functional groups in the graft copolymers of this invention. These copolymers are designed to be used as a binder component; accordingly, the presence of the ionic groups in the copolymer will increase the water sensitivity and lead to defects in the finished coatings.

The backbone provides another dimension in design for potentially even more sophisticated architectures. The types of monomers and monomer mixtures and their resulting properties and the attached functional groups discussed above can also be advantageously added to the backbone. The properties and the functional groups on the backbone may be the same or similar to either one of the segments on the arms or entirely different. The unique combinations of the backbone and the segmented arms will determine the overall properties of the polymers of this invention.

Other possible combinations of the segmented arms along with the backbone will be apparent to those skilled in the art.

Preferably, the graft copolymer of this invention contains about 10-90% by weight, preferably about 20-80% by weight, of polymeric backbone and correspondingly about 90-10% by weight, preferably about 80-20% by weight, of side chains or so-called segmented arms. The graft copolymer generally has a weight average molecular weight of about 5,000-200,000 and preferably about 10,000-100,000. The segmented macromonomers used to form the segmented arms typically have a weight average molecular weight of about 1,000-40,000, and preferably about 2,000 to 25,000. All molecular weights referred herein are determined by GPC (gel permeation chromatography) using a polystyrene standard. As indicated above, the choice of monomers and monomer mixtures for each segment and the backbone, the segment size, overall ratios of monomers used to form the segmented arms and the backbone, and molecular weights, and nature of each segment and the backbone will vary so as to provide the particular attribute desired for a particular application.

Graft copolymers of this invention may be added as binder resins to a variety of solvent borne or water borne coatings or paint compositions such as automotive primers, primer surfacers, topcoats which may be monocoats, or basecoats of a clearcoat/basecoat finishes, or clearcoats. These compositions may contain pigment dispersions, additives such as antioxidants, flow control agents, surfactants, UV stabilizers, and rheology control agents such as fumed silica and microgels. They may be used in combination with other film forming polymers such as acrylics, polyesters, polyurethanes, acrylourethanes, polyester urethanes, alkyds, polyethers and the like to adjust the film properties. These coating compositions may also contain crosslinking agents such as polyisocyanates, blocked polyisocyanates, alkylated melamines, epoxy resins, and the like. These coatings are also suitable as clear or pigmented coatings in architectural (house paint), industrial, and maintenance coating applications, as well as in ink applications including ink jet printing. The coatings formulated with the copolymers of this invention are particularly suitable for providing coatings on a variety of substrates, such as metal, plastic, composite, paper, wood and concrete substrates. With the control and the flexibility in placing the functional groups at the desired locations at an optimal concentration to suit the application needs from this invention, a much more robust coating can be formed. Copolymers of this invention are particularly useful as binders in fast-drying coatings, such as air-dry acrylic lacquer color coat compositions used in automotive refinishing, to be covered with a clear coat finish to add aesthetic appeal.

For waterborne applications, the graft copolymers of this invention may contain polar groups such as carboxyl and these groups may have to be neutralized with a base to render the graft copolymer soluble or dispersible in a water borne carrier in order for them be incorporated into a waterborne paint. An organic base with high volatility such as amines or amine alcohols are conveniently used by one skilled in the art. Examples include, triethylamine, dimethylethanolamine (DMEA), methyldiethanolamine, 2-amino-2-methyl propanol, etc. The neutralizing agents will evaporate during the curing step either at room temperature or at an elevated temperature to render the coating insoluble and insensitive to humidity.

The following Examples illustrate the invention. All parts and percentages are on a weight basis unless otherwise indicated. Molecular weights disclosed below are determined by GPC using a polystyrene standard. Mn represents number average molecular weight and Mw represents weight average molecular weight. All viscosity measurements are reported using a Gardner Holtz scale.

EXAMPLE 1

Preparation of HEMA/BMA/MMA Macromonomer, 25/50/25% by Weight

This example illustrates the preparation of a macromonomer with primary hydroxyl groups that can be used to form the A segment (outer segment) of a segmented arm for a graft copolymer of this invention. A 12-liter flask was equipped with a thermometer, stirrer, addition funnels, heating mantel, reflux condenser and a means of maintaining a nitrogen blanket over the reactants. The flask was held under nitrogen positive pressure and the following ingredients were employed.

|  | Weight (gram) |
|---|---|
| Portion 1 | |
| Methyl propyl ketone | 960.6 |
| Methyl methacrylate (MMA) | 282.76 |
| Butyl methacrylate (BMA) | 565.53 |
| 2-Hydroxyethyl methacrylate (HEMA) | 282.76 |
| Portion 2 | |
| Diaquabis(borondifluorodiphenyl glyoximato) cobaltate (II), Co(DPG-BF$_2$) | 1.131 |
| Acetone | 177.5 |
| Portion 3 | |
| 2,2'-Azobis(methylbutyronitrile) (Vazo ® 67 by DuPont Co., Wilmington, DE) | 9.77 |
| Methyl propyl ketone | 107 |
| Portion 4 | |
| Methyl methacrylate (MMA) | 1131.06 |
| Butyl methacrylate (BMA) | 2262.11 |
| 2-Hydroxyethyl methacrylate (HEMA) | 1131.06 |
| Portion 5 | |
| 2,2'-Azobis(methylbutyronitrile) (Vazo ® 67 by DuPont Co., Wilmington, DE) | 97.68 |
| Methyl propyl ketone | 1070 |
| Total | 8078.961 |

Portion 1 mixture was charged to the flask and the mixture was heated to reflux temperature and refluxed for about 20 minutes. Portion 2 and Portion 3 solution were added through separate addition funnels over 10 minutes and the reaction mixture was refluxed for 10 minutes. Portion 4 was fed to the flask over 240 minutes while Portion 5 was simultaneously fed to the flask over 270 minutes, and the reaction mixture was held at reflux temperature throughout the course of additions. Reflux was continued for another 2 hours and the solution was cooled to room temperature and poured out of the flak into a jar. The resulting macromonomer solution was a light yellow clear polymer solution and had a solid content of about 64.8% and a Gardner-Holtz viscosity of I. The macromonomer had a 2,534 Mw and 1,878 Mn.

EXAMPLE 2

Preparation of an AB Segmented Macromonomer BMA/MMA//HEMA/BMA/MMA, 30/30//10/20/10% by Weight This example shows the preparation of a segmented macromonomer where the B segment (inner segment) has no specific functional groups and the A segment (outer segment) contains primary hydroxyl groups from the macromonomer prepared above. It can be used to form a segmented arm of a graft copolymer of this invention.

A 2-liter flask was equipped as in Example 1. The flask was held under nitrogen positive pressure and the following ingredients were employed.

|  | Weight (gram) |
|---|---|
| Portion 1 | |
| Macromonomer of Example 1 | 502.9 |
| Methyl propyl ketone | 147.9 |
| Portion 2 | |
| Methyl methacrylate (MMA) | 264 |
| Butyl methacrylate (BMA) | 264 |
| Portion 3 | |
| t-Butyl peroctoate (Elf Atochem North America, Inc., Philadelphia, PA) | 15.0 |
| Methyl propyl ketone | 160.0 |
| Total | 1353.8 |

Portion 1 mixture was charged to the flask and the mixture was heated to reflux temperature and refluxed for about 10 minutes. Portion 2 was added over 3 hours and Portion 3 was simultaneously added over 3.5 hours while the reaction mixture was held at reflux temperature. The reaction mixture was refluxed for another 1.5 hours. After cooling, the resulting macromonomer solution was a clear polymer solution and had a solid content of about 63.9% and a Gardner-Holtz viscosity of R. The macromonomer had a 5,223 Mw and 3,628 Mn.

EXAMPLE 3

Preparation of a Graft Copolymer with Segmented Arms

This example shows the preparation of a graft copolymer of this invention containing secondary hydroxyl groups on the backbone, primary hydroxyl groups on the A segment of the arm, and no specific functional groups on the B segment of the segmented arm, specifically methyl acrylate-co-isobornyl acrylate-co-hydroxypropyl acrylate-g-butyl methacrylate-co-methyl methacrylate-b-hydroxyethyl methacrylate-co-butyl methacrylate-co-methyl methacrylate, 15/27/3//16.5/16.5//5.5/11/5.5% by weight, from a macromonomer prepared above.

A 2-liter flask was equipped as in Example 1. The flask was held under nitrogen positive pressure and the following ingredients were employed.

|  | Weight (gram) |
|---|---|
| Portion 1 | |
| Macromonomer of Example 2 | 500.0 |
| Ethyl acetate | 45.7 |
| Portion 2 | |
| Methyl acrylate | 88.7 |
| Isobornyl acrylate | 159.63 |
| Hydroxypropyl acrylate | 17.74 |
| Portion 3 | |
| t-Butyl peroctoate (Elf Atochem North America, Inc., Philadelphia, PA) | 7.39 |
| Ethyl acetate | 73.9 |
| Portion 4 | |
| t-Butyl peroctoate (Elf Atochem North America, Inc., Philadelphia, PA) | 1.47 |
| Ethyl acetate | 14.7 |
| Total | 909.23 |

Portion 1 mixture was charged to the flask and the mixture was heated to reflux temperature and refluxed for about 10 minutes. Portion 2 and 3 were simultaneously added over 3 hours while the reaction mixture was held at reflux temperature. The reaction mixture was refluxed for 30 minutes. Portion 4 was added over 5 minutes, and the reaction mixture was refluxed for another 2 hours. After cooling, the resulting graft copolymer solution was clear and had a solid content of about 66.7% and a Gardner-Holtz viscosity of Z1+½. The graft copolymer had a 51,803 Mw and 11,003 Mn, and a Tg of 51 C measured by Differential Scanning Calorimetry (DSC).

EXAMPLE 4

Preparation of an AB Segmented Macromonomer BMA/MMA/MAA//HEMA/BMA/MMA, 10/44/6//10/20/10% by Weight This example shows the preparation of a segmented macromonomer where the B segment (inner segment) has carboxylic acid groups and a very high calculated Tg of 96° C. and the A segment (outer segment) contains primary hydroxyl groups from the macromonomer prepared in Example 1. It can be used to form a segmented arm of a graft copolymer of this invention.

A 5-liter flask was equipped as in Example 1. The flask was held under nitrogen positive pressure and the following ingredients were employed.

|  | Weight (gram) |
|---|---|
| Portion 1 | |
| Macromonomer of Example 1 | 1005.8 |
| Methyl propyl ketone | 295.8 |

-continued

| | Weight (gram) |
|---|---|
| Portion 2 | |
| Methyl methacrylate (MMA) | 774.4 |
| Butyl methacrylate (BMA) | 176 |
| Methacrylic acid (MAA) | 105.6 |
| Portion 3 | |
| t-Butyl peroctoate (Elf Atochem North America, Inc., Philadelphia, PA) | 30.0 |
| Methyl propyl ketone | 320.0 |
| Total | 2707.6 |

The procedure of Example 2 was repeated. After final cooling, the resulting macromonomer solution was clear and had a solid content of about 65.0% and a Gardner-Holtz viscosity of Z2+½. The macromonomer had a 4,818 Mw and 3,413 Mn.

EXAMPLE 5

Preparation of a Graft Copolymer with Segmented Arms

This example shows the preparation of a graft copolymer of this invention containing secondary hydroxyl groups on the backbone, primary hydroxyl groups on the A segment of the arm, and carboxylic acid groups on the B segment of the segmented arm, specifically methyl acrylate-co-isobornyl acrylate-co-hydroxypropyl acrylate-g-butyl methacrylate-co-methyl methacrylate-co-methacrylic acid-b-hydroxyethyl methacrylate-co-butyl methacrylate-co-methyl methacrylate, 15/27/3//5.5/24.2/3.3//5.5/11/5.5% by weight, from a macromonomer prepared above. The B segment has a very high calculated Tg. A 2-liter flask was equipped as in Example 1. The flask was held under nitrogen positive pressure and the following ingredients were employed.

| | Weight (gram) |
|---|---|
| Portion 1 | |
| Macromonomer of Example 4 | 592.3 |
| Ethyl acetate | 165.3 |
| Portion 2 | |
| Methyl acrylate | 105.0 |
| Isobornyl acrylate | 189.0 |
| Hydroxypropyl acrylate | 21.0 |
| Portion 3 | |
| t-Butyl peroctoate (Elf Atochem North America, Inc., Philadelphia, PA) | 8.75 |
| Ethyl acetate | 158 |
| Portion 4 | |
| t-Butyl peroctoate (Elf Atochem North America, Inc., Philadelphia, PA) | 1.75 |
| Ethyl acetate | 31.6 |
| Total | 1272.7 |

The procedure of Example 3 was repeated. After final cooling, the resulting graft copolymer solution was clear and had a solid content of about 55.9% and a Gardner-Holtz viscosity of X. The graft copolymer had a 55,763 Mw and 8,879 Mn, and a Tg of 58.8° C. measured by Differential Scanning Calorimetry.

EXAMPLE 6

Preparation of HEMA/EHMA Macromonomer, 50/50% by Weight

This example illustrates the preparation of a macromonomer with primary hydroxyl groups that can be used to form the A segment (outer segment) of a segmented arm for a graft copolymer of this invention.

A 12-liter flask was equipped as in Example 1. The flask was held under nitrogen positive pressure and the following ingredients were employed.

| | Weight (gram) |
|---|---|
| Portion 1 | |
| Methyl propyl ketone | 1581.7 |
| 2-Hydroxyethyl methacrylate (HEMA) | 565.53 |
| 2-Ethylhexyl methacrylate (EHMA) | 565.53 |
| Portion 2 | |
| Diaquabis(borondifluorodiphenyl glyoximato) cobaltate (II), Co(DPG-BF$_2$) | 1.414 |
| Acetone | 177.5 |
| Portion 3 | |
| 2,2'-Azobis(methylbutyronitrile) (Vazo ® 67 by DuPont Co., Wilmington, DE) | 9.77 |
| Methyl propyl ketone | 107 |
| Portion 4 | |
| 2-Hydroxyethyl methacrylate (HEMA) | 2262.12 |
| 2-Ethylhexyl methacrylate (EHMA) | 2262.12 |
| Portion 5 | |
| 2,2'-Azobis(methylbutyronitrile) (Vazo ® 67 by DuPont Co., Wilmington, DE) | 97.68 |
| Methyl propyl ketone | 1070 |
| Total | 8700.36 |

The procedure of Example 1 was repeated. The resulting macromonomer solution was a light yellow clear polymer solution and had a solid content of about 63.2% and a Gardner-Holtz viscosity of C. The macromonomer had a 3,356 Mw and 2,383 Mn.

EXAMPLE 7

Preparation of an AB Segmented Macromonomer BMA/MMA/MAA//HEMA/EHMA, 35/50//7.5/7.5% by Weight This example shows the preparation of a segmented macromonomer where the B segment (inner segment) has no specific functional groups but a relatively high calculated Tg of 64.6 C and the A segment (outer segment) contains primary hydroxyl groups and a relatively low calculated Tg of 18.9° C., from the macromonomer prepared in Example 6. It can be used to form a segmented arm of a graft copolymer of this invention.

A 5-liter flask was equipped as in Example 1. The flask was held under nitrogen positive pressure and the following ingredients were employed.

| | Weight (gram) |
|---|---|
| Portion 1 | |
| Macromonomer of Example 6 | 406.15 |
| Methyl propyl ketone | 681.1 |
| Portion 2 | |
| Methyl methacrylate (MMA) | 880.0 |
| Butyl methacrylate (BMA) | 616.0 |
| Portion 3 | |
| t-Butyl peroctoate (Elf Atochem North America, Inc., Philadelphia, PA) | 30.0 |
| Methyl propyl ketone | 320.0 |
| Total | 2933.25 |

The procedure of Example 2 was repeated. After final cooling, the resulting macromonomer solution was clear and had a solid content of about 59.4% and a Gardner-Holtz viscosity of Z. The macromonomer had a 13,886 Mw and 7,485 Mn.

EXAMPLE 8

Preparation of a Graft Copolymer with Segmented Arms

This example shows the preparation of a graft copolymer of this invention containing primary hydroxyl groups and carboxylic acid groups on the backbone, primary hydroxyl groups on the A segment (outer segment) of the arm, and no specific functional groups on the B segment (inner segment) of the arm, specifically methyl methacrylate-co-butyl acrylate-co-hydroxyethyl acrylate-co-acrylic acid-g-butyl methacrylate-co-methyl methacrylate-b-hydroxyethyl methacrylate-co-ethyl hexyl methacrylate, 30/20/6/4//14/20//3/3% by weight, from a macromonomer prepared above. The A segment is relatively short, and the B segment has a relatively high calculated Tg.

A 2-liter flask was equipped as in Example 1. The flask was held under nitrogen positive pressure and the following ingredients were employed.

| | Weight (gram) |
|---|---|
| Portion 1 | |
| Macromonomer of Example 7 | 466.7 |
| Ethyl acetate | 185.9 |
| Portion 2 | |
| Methyl methacrylate | 210.0 |
| Butyl acrylate | 140.0 |
| Hydroxyethyl acrylate | 42.0 |
| Acrylic acid | 28.0 |
| Portion 3 | |
| t-Butyl peroctoate (Elf Atochem North America, Inc., Philadelphia, PA) | 8.75 |
| Ethyl acetate | 158 |
| Portion 4 | |
| t-Butyl peroctoate (Elf Atochem North America, Inc., Philadelphia, PA) | 1.75 |
| Ethyl acetate | 31.6 |
| Total | 1272.7 |

The procedure of Example 3 was repeated. After final cooling, the resulting graft copolymer solution was clear and had a solid content of about 56.2% and a Gardner-Holtz viscosity of Z2-¼. The graft copolymer had a 51,356 Mw and 14,001 Mn, and a Tg of 45.3° C. measured by Differential Scanning Calorimetry.

EXAMPLE 9

Preparation of HEMA/BMA Macromonomer, 50/50% by Weight

This example illustrates the preparation of a macromonomer with primary hydroxyl groups that can be used to form the A segment (outer segment) of a segmented arm for a graft copolymer of this invention.

A 12-liter flask was equipped as in Example 1. The flask was held under nitrogen positive pressure and the following ingredients were employed.

| | Weight (gram) |
|---|---|
| Portion 1 | |
| Methyl propyl ketone | 1581.7 |
| Butyl methacrylate (BMA) | 565.53 |
| 2-Hydroxyethyl methacrylate (HEMA) | 565.53 |
| Portion 2 | |
| Diaquabis(borondifluorodiphenyl glyoximato) cobaltate (II), Co(DPG-BF$_2$) | 1.414 |
| Acetone | 177.5 |
| Portion 3 | |
| 2,2'-Azobis(methylbutyronitrile) (Vazo ® 67 by DuPont Co., Wilmington, DE) | 9.77 |
| Methyl propyl ketone | 107 |
| Portion 4 | |
| Butyl methacrylate (BMA) | 2262.11 |
| 2-Hydroxyethyl methacrylate (HEMA) | 2262.11 |
| Portion 5 | |
| 2,2'-Azobis(methylbutyronitrile) (Vazo ® 67 by DuPont Co., Wilmington, DE) | 97.68 |
| Methyl propyl ketone | 1070 |
| Total | 8700.344 |

The procedure of Example 1 was repeated. The resulting macromonomer solution was clear and had a solid content of about 62.4% and a Gardner-Holtz viscosity of D. The macromonomer had a 3,009 Mw and 2,181 Mn.

EXAMPLE 10

Preparation of an AB Segmented Macromonomer BMA/MMA//HEMA/BMA, 30/50//10/10% by Weight This example shows the preparation of a segmented macromonomer where the B segment (inner segment) has no specific functional groups but a relatively high calculated Tg of 67.9° C. and the A segment (outer segment) contains primary hydroxyl groups from the macromonomer prepared in Example 10. It can be used to form a segmented arm of a graft copolymer of this invention.

A 5-liter flask was equipped as in Example 1. The flask was held under nitrogen positive pressure and the following ingredients were employed.

|  | Weight (gram) |
|---|---|
| Portion 1 | |
| Macromonomer of Example 9 | 758.1 |
| Methyl propyl ketone | 571.3 |
| Portion 2 | |
| Methyl methacrylate (MMA) | 1232.0 |
| Butyl methacrylate (BMA) | 739.0 |
| Portion 3 | |
| t-Butyl peroctoate (Elf Atochem North America, Inc., Philadelphia, PA) | 42.0 |
| Methyl propyl ketone | 448.0 |
| Total | 3790.4 |

The procedure of Example 2 was repeated. After final cooling, the resulting macromonomer solution was clear and had a solid content of about 64.5% and a Gardner-Holtz viscosity of Z4-½. The macromonomer had a 10,437 Mw and 6,216 Mn.

EXAMPLE 11

Preparation of a Graft Copolymer with Segmented Arms

This example shows the preparation of a graft copolymer of this invention containing secondary amine groups on the backbone, primary hydroxyl groups on the A segment of the arm, and no specific functional groups on the B segment of the arm, specifically methyl methacrylate-co-butyl acrylate-co-hydroxyethyl acrylate-co-t-butylaminoethyl methacrylate-g-butyl methacrylate-co-methyl methacrylate-b-hydroxyethyl methacrylate-co-butyl methacrylate, 30/20/6/4//2/20/14/4% by weight, from a macromonomer prepared above. The A segment is relatively short, and the B segment has a relatively high calculated Tg.

A 2-liter flask was equipped as in Example 1. The flask was held under nitrogen positive pressure and the following ingredients were employed.

|  | Weight (gram) |
|---|---|
| Portion 1 | |
| Macromonomer of Example 10 | 430.8 |
| Ethyl acetate | 221.8 |
| Portion 2 | |
| Methyl methacrylate | 210.0 |
| Butyl acrylate | 140.0 |
| Hydroxyethyl acrylate | 42.0 |
| t-Butylaminoethyl methacrylate | 28.0 |
| Portion 3 | |
| t-Butyl peroctoate (Elf Atochem North America, Inc., Philadelphia, PA) | 8.75 |
| Ethyl acetate | 158 |
| Portion 4 | |
| t-Butyl peroctoate (Elf Atochem North America, Inc., Philadelphia, PA) | 1.75 |
| Ethyl acetate | 31.6 |
| Total | 1272.7 |

The procedure of Example 3 was repeated. After final cooling, the resulting graft copolymer solution was clear and had a solid content of about 54.8% and a Gardner-Holtz viscosity of W. The graft copolymer had a Tg of 45.3° C. measured by Differential Scanning Calorimetry. The molecular weight cannot be measured under the standard condition due to interaction of the amine functional groups with the solid phase of GPC.

EXAMPLE 12

Preparation of AAEM/EHMA Macromonomer, 50/50% by Weight

This example illustrates the preparation of a macromonomer with acetoacetyl groups that can be used to form the A segment (outer segment) of a segmented arm for a graft copolymer of this invention.

A 5-liter flask was equipped as in Example 1. The flask was held under nitrogen positive pressure and the following ingredients were employed.

|  | Weight (gram) |
|---|---|
| Portion 1 | |
| Methyl propyl ketone | 636.3 |
| 2-Acetoacetoxyethyl methacrylate (AAEM) | 227.5 |
| 2-Ethylhexyl methacrylate (EHMA) | 227.5 |
| Portion 2 | |
| Diaquabis(borondifluorodiphenyl glyoximato) cobaltate (II), Co(DPG-BF$_2$) | 0.569 |
| Acetone | 71.4 |
| Portion 3 | |
| 2,2'-Azobis(methylbutyronitrile) (Vazo ® 67 by DuPont Co., Wilmington, DE) | 3.93 |
| Methyl propyl ketone | 43.0 |
| Portion 4 | |
| 2-Acetoacetoxyethyl methacrylate (AAEM) | 910.0 |
| 2-Ethylhexyl methacrylate (BMA) | 910.0 |
| Portion 5 | |
| 2,2'-Azobis(methylbutyronitrile) (Vazo ® 67 by DuPont Co., Wilmington, DE) | 39.3 |
| Methyl propyl ketone | 430.4 |
| Total | 3499.9 |

The procedure of Example 1 was repeated. The resulting macromonomer solution was a light yellow clear polymer solution and had a solid content of about 64.2% and a Gardner-Holtz viscosity of A-1. The macromonomer had a 3,962 Mw and 2,735 Mn.

EXAMPLE 13

Preparation of an AB Segmented Macromonomer BMA/MMA//AAEM/EHMA, 20/50//15/15% by Weight This example shows the preparation of a segmented macromonomer where the B segment (inner segment) has no specific functional groups but a relatively high calculated Tg of 76° C. and the A segment (outer segment) contains acetoacetyl groups from the macromonomer prepared in Example 12. It can be used to form a segmented arm of a graft copolymer of this invention.

A 5-liter flask was equipped as in Example 1. The flask was held under nitrogen positive pressure and the following ingredients were employed.

|  | Weight (gram) |
|---|---|
| Portion 1 | |
| Macromonomer of Example 12 | 812.3 |
| Methyl propyl ketone | 283.3 |
| Portion 2 | |
| Methyl methacrylate (MMA) | 880.0 |
| Butyl methacrylate (BMA) | 352.0 |
| Portion 3 | |
| t-Butyl peroctoate (Elf Atochem North America, Inc., Philadelphia, PA) | 30.0 |
| Methyl propyl ketone | 350.0 |
| Total | 2707.6 |

The procedure of Example 2 was repeated. After final cooling, the resulting macromonomer solution was clear and had a solid content of about 63.4% and a Gardner-Holtz viscosity of Z3. The macromonomer had a 17,923 Mw and 9,066 Mn.

EXAMPLE 14

Preparation of a Graft Copolymer with Segmented Arms

This example shows the preparation of a graft copolymer of this invention containing relatively low concentration of the acetoacetyl groups on the backbone, high concentration of the acetoacetyl groups on the A segment of the arm, and no specific functional groups on the B segment of the arm, specifically methyl methacrylate-co-butyl acrylate-co-hydroxyethyl acrylate-co-2-acetoacetoxyethyl methacrylate-g-butyl methacrylate-co-methyl methacrylate-b-2-acetoacetoxyethyl methacrylate-co-2-ethylhexyl methacrylate, 25/20/5/5//9/22.5//6.75/6.75% by weight, from a macromonomer prepared above. The B segment has a relatively high calculated Tg of 76° C., and the backbone and the A segment have 3.1 C and −31.6 C as calculated Tg respectively.

A 2-liter flask was equipped as in Example 1. The flask was held under nitrogen positive pressure and the following ingredients were employed.

|  | Weight (gram) |
|---|---|
| Portion 1 | |
| Macromonomer of Example 13 | 484.6 |
| Ethyl acetate | 272.6 |
| Portion 2 | |
| Methyl methacrylate | 175.0 |
| Butyl acrylate | 140.0 |
| Hydroxyethyl acrylate | 35.0 |
| 2-Acetoacetoxyethyl methacrylate | 35.0 |
| Portion 3 | |
| t-Butyl peroctoate (Elf Atochem North America, Inc., Philadelphia, PA) | 8.75 |
| Ethyl acetate | 100 |

-continued

|  | Weight (gram) |
|---|---|
| Portion 4 | |
| t-Butyl peroctoate (Elf Atochem North America, Inc., Philadelphia, PA) | 1.75 |
| Ethyl acetate | 20.0 |
| Total | 1272.7 |

The procedure of Example 3 was repeated. After final cooling, the resulting graft copolymer solution was clear and had a solid content of about 57.6% and a Gardner-Holtz viscosity of Z3. The graft copolymer had a 67,644 Mw and 20,472 Mn, and a Tg of 34.3° C. measured by Differential Scanning Calorimetry.

EXAMPLE 15

Preparation of HEMA/EHMA Macromonomer, 40/60% by Weight

This example illustrates the preparation of a macromonomer with primary hydroxyl groups that can be used to form the A segment (outer segment) of a segmented arm for a graft copolymer of this invention.

A 5-liter flask was equipped as in Example 1. The flask was held under nitrogen positive pressure and the following ingredients were employed.

|  | Weight (gram) |
|---|---|
| Portion 1 | |
| Methyl propyl ketone | 632.76 |
| 2-Ethylhexyl methacrylate (EHMA) | 271.44 |
| 2-Hydroxyethyl methacrylate (HEMA) | 180.96 |
| Portion 2 | |
| Diaquabis(borondifluorodiphenyl glyoximato) cobaltate (II), Co(DPG-BF$_2$) | 0.4524 |
| Acetone | 71.00 |
| Portion 3 | |
| 2,2'-Azobis(methylbutyronitrile) (Vazo ® 67 by DuPont Co., Wilmington, DE) | 42.98 |
| Methyl propyl ketone | 470.80 |
| Portion 4 | |
| 2-Ethylhexyl methacrylate (EHMA) | 1085.76 |
| 2-Hydroxyethyl methacrylate (HEMA) | 723.84 |
| Total | 3479.99 |

Portion 1 mixture was charged to the flask. Portion 2 was mixed well and added to the flask. The mixture was heated to reflux temperature and refluxed for about 10 minutes. Portion 3 (9.1%, 46.75 g) was added over 10 minutes and the reaction mixture was refluxed for 10 minutes. Portion 4 was fed to the flask over 180 minutes while the remainder of Portion 3 (467.03 g) was simultaneously fed to the flask over 210 minutes, and the reaction mixture was held at reflux temperature throughout the course of additions. Reflux was continued for another 2 hours and the solution was cooled to room temperature and poured out of the flak into ajar. The resulting macromonomer solution was a light yellow clear polymer solution and had a solid content of about 63.6% and a Gardner-Holtz viscosity of A+½. The macromonomer had a 3,497 Mw and 2,613 Mn.

EXAMPLE 16

Preparation of an AB Segmented Macromonomer BMA/MMA//HEMA/EHMA, 35/30//14/21% by Weight This example shows the preparation of a segmented macromonomer where the B segment (inner segment) has no specific functional groups and the A segment (outer segment) contains primary hydroxyl groups from the macromonomer prepared in Example 15. It can be used to form a segmented arm of a graft copolymer of this invention.

A 5-liter flask was equipped as in Example 1. The flask was held under nitrogen positive pressure and the following ingredients were employed.

|  | Weight (gram) |
|---|---|
| Portion 1 | |
| Macromonomer of Example 15 | 947.7 |
| Methyl propyl ketone | 266.0 |
| Portion 2 | |
| Methyl methacrylate (MMA) | 528.0 |
| Butyl methacrylate (BMA) | 616.0 |
| Portion 3 | |
| t-Butyl peroctoate (Elf Atochem North America, Inc., Philadelphia, PA) | 30.0 |
| Methyl propyl ketone | 320.0 |
| Total | 2707.7 |

The procedure of Example 2 was repeated. After final cooling, the resulting macromonomer solution was clear and had a solid content of about 66.3% and a Gardner-Holtz viscosity of V. The macromonomer had a 7,278 Mw and 4,725 Mn.

EXAMPLE 17

Preparation of a Graft Copolymer with Segmented Arms

This example shows the preparation of a graft copolymer of this invention containing primary hydroxyl groups on the backbone, primary hydroxyl groups on the A segment of the arm, and no specific functional groups on the B segment of the arm, specifically methyl methacrylate-co-butyl acrylate-co-hydroxyethyl acrylate-g-butyl methacrylate-co-methyl methacrylate-b-hydroxyethyl methacrylate-co-ethylhexyl methacrylate, 15/20/5//21/181/8.4/12.6% by weight, from a macromonomer prepared above. The A segment is relatively short, and the B segment has a relatively high calculated Tg.

A 2-liter flask was equipped as in Example 1. The flask was held under nitrogen positive pressure and the following ingredients were employed.

|  | Weight (gram) |
|---|---|
| Portion 1 | |
| Macromonomer of Example 16 | 646.16 |
| Ethyl acetate | 19.8 |
| Portion 2 | |
| Methyl methacrylate | 105.0 |
| Butyl acrylate | 140.0 |
| Hydroxyethyl acrylate | 35.0 |
| Portion 3 | |
| t-Butyl peroctoate (Elf Atochem North America, Inc., Philadelphia, PA) | 9.0 |
| Ethyl acetate | 110.0 |
| Portion 4 | |
| t-Butyl peroctoate (Elf Atochem North America, Inc., Philadelphia, PA) | 0.9 |
| Ethyl acetate | 11.0 |
| Total | 1076.86 |

The procedure of Example 3 was repeated. After final cooling, the resulting graft copolymer solution was clear and had a solid content of about 66.3% and a Gardner-Holtz viscosity of Z2. The graft copolymer had a 29,309 Mw and 9,660 Mn, and a Tg of 26.1 C measured by Differential Scanning Calorimetry.

EXAMPLE 18

Preparation of a Graft Copolymer with Segmented Arms

This example shows the preparation of a graft copolymer similar to Example 17 at a lower molecular weight, specifically methyl methacrylate-co-butyl acrylate-co-hydroxyethyl acrylate-g-butyl methacrylate-co-methyl methacrylate-b-hydroxyethyl methacrylate-co-ethylhexyl methacrylate, 12/18/5//22.75/19.5/19.10/13.65% by weight, from a macromonomer prepared above.

A 2-liter flask was equipped as in Example 1. The flask was held under nitrogen positive pressure and the following ingredients were employed.

|  | Weight (gram) |
|---|---|
| Portion 1 | |
| Macromonomer of Example 16 | 700.0 |
| Ethyl acetate | 18.6 |
| Portion 2 | |
| Methyl methacrylate | 84.0 |
| Butyl acrylate | 126.0 |
| Hydroxyethyl acrylate | 35.0 |
| Portion 3 | |
| t-Butyl peroctoate (Elf Atochem North America, Inc., Philadelphia, PA) | 8.0 |
| Ethyl acetate | 95.0 |
| Portion 4 | |
| t-Butyl peroctoate (Elf Atochem North America, Inc., Philadelphia, PA) | 0.8 |
| Ethyl acetate | 9.5 |
| Total | 1076.9 |

The procedure of Example 3 was repeated. After final cooling, the resulting graft copolymer solution was clear and had a solid content of about 65.7% and a Gardner-Holtz viscosity of Z. The graft copolymer had a 21,495 Mw and 6,960 Mn, and a Tg of 25.1° C. measured by Differential Scanning Calorimetry.

EXAMPLE 19-20

Preparation of an Isocyanate Crosslinked Clearcoat for Automotive Refinishing Using Branched Acrylics with Segmented Arms A two-component isocyanate clearcoat was prepared by mixing together the ingredients listed in Table 1 in an air mixer in the order shown.

TABLE 1

Clearcoat Preparation

|  | Ex. 19 | Ex. 20 |
|---|---|---|
|  | Parts by Weight | |
| Portion 1 | | |
| Graft Polymer with Segmented Arms of Example 17 | 30 | 0 |
| Graft Polymer with Segmented Arms of Example 18 | 0 | 30 |
| Butyl Acetate | 8.15 | 7.99 |
| Flow Additive[1] | 0.24 | 0.24 |
| Catalyst Solution[2] | 1.2 | 1.2 |
| Portion 2 | | |
| Isocyanate Crosslinking Agent[3] | 4.2 | 4.37 |

Table Footnotes
[1] 20% BYK 301 ® flow additive in propylene glycol monomethyl ether acetate, supplied by BYK-CHEMIE, Wallingford, Connecticut.
[2] 1% Di butyl tin dilaurate in methyl ethyl ketone, supplied by Elf-Atochem North America, Inc. Philadelphia, Pennsylvania.
[3] Tolonate ® HDT - Isocyanurate trimer of hexamethylene diisocyanate (HDI Trimer) supplied by RHODIA INC., Cranbury, New Jersey.

For each of Examples 15 and 16 above, the constituents of Portion 1 were charged into a mixing vessel in the order shown above and mixed, then Portion 2 was premixed and charged into the mixing vessel and thoroughly mixed with Portion 1 to form each of the clearcoats of these Examples.

Following preparation, each of the coating compositions was applied with a doctor blade over a separate phosphated cold roll steel panel primed with a layer of PowerCron® Primer supplied by PPG, Pittsburgh, Pa., to a dry coating thickness of 50 micrometers and air dried at ambient temperature conditions. Then the panels were tested using the tests set forth below and the results of the test are shown in the following Table.

Test Methods Used in the Examples

The following test methods were used for generating data reported in Table 2 below.

Swell Ratio

The swell ratio of a free film (removed from a sheet of TPO—thermoplastic olefin) was determined by swelling the film in methylene chloride. The free film was placed between two layers of aluminum foil and using a LADD punch, a disc of about 3.5 mm in diameter was punched out of the film and the foil was removed from the film. The diameter of the unswollen film ($D_o$) was measured using a microscope with a 10× magnification and a filar lens. Four drops of methylene chloride were added to the film and the film was allowed to swell for a few second and then a glass slide was placed over the film and the swollen film diameter ($D_s$) was measured. The swell ratio was then calculated as follow:

$$\text{Swell Ratio} = (D_s)^2/(D_o)^2$$

Persoz Hardness Test

The change in film hardness of the coating was measured with respect to time by using a Persoz hardness tester Model No. 5854 (ASTM D4366), supplied by Byk-Mallinckrodt, Wallingford, Conn. The number of oscillations (referred to as Persoz number) were recorded.

Hardness (Fischer)

Hardness was measured using a Fischerscope® hardness tester (the measurement is in Newtons per square millimeter).

Water Spot

Water spot rating is a measure of how well the film is crosslinked early in the curing of the film. If water spot damage is formed on the film, this is an indication that the cure is not complete and further curing of the film is needed before the film can be wet sanded or buffed or moved from the spray both. The water spot rating is determined in the following manner.

Coated panels are laid on a flat surface and deionized water was applied with a pipette at 1 hour timed intervals. A drop about ½ inch in diameter was placed on the panel and allowed to evaporate. The spot on the panel was checked for deformation and discoloration. The panel was wiped lightly with cheesecloth wetted with deionized water, which was followed by lightly wiping the panel dry with the cloth. The panel was then rated on a scale of 1 to 10. Rating of 10 best—no evidence of spotting or distortion of discoloration, rating 9—barely detectable, rating 8—slight ring, rating 7—very slight discoloration or slight distortion, rating 6—slight loss of gloss or slight discoloration, rating 5—definite loss of gloss or discoloration, rating of 4—slight etching or definite distortion, rating of 3—light lifting, bad etching or discoloration, rating of 2—definite lifting and rating of 1—dissolving of the film.

Cotton Tack FreeTime

Allow coated panel to dry for set period of time (e.g. 30 minutes). Drop a cotton ball from a height of 1 inch onto the surface of the panel and leave the cotton ball on the surface for a set time interval and invert panel. Repeat above until the time the cotton ball drops off of the panel on inversion and note that as the cotton tack free time.

BK Time

Surface drying times of coated panels measured according to ASTM D5895.

Gel Fraction

Measured according to the procedure set forth in U.S. Pat. No. 6,221,494 col. 8 line 56 to col. 9 line 2 which procedure is hereby incorporated by reference.

Time to Gel

The time it takes for a liquid coating to gel.

Appearance

Visual observation of paint in solution and after drying.

TABLE 2

Test Results

| Test Methods | Example #19 | Example #20 |
|---|---|---|
|  | Branched Acrylic of Example 17 | Branched Acrylic of Example 18 |
|  | Mn = 9.7K; MW = 29k | Mn = 7K; MW = 21.5k |
|  | Tg = 26; EW = 929 | Tg = 25.1; EW = 885 |
|  | HDI TRIMER | HDI TRIMER |

TABLE 2-continued

Test Results

| Test Methods | Example #19 | Example #20 |
|---|---|---|
| | NCO/OH = 1.05 | NCO/OH = 1.05 |
| | 500 PPM DBTDL | 500 PPM DBTDL |
| | Ave func = 10.4 | Ave func = 7.9 |
| Theoretical clear weight solids | 55 | 55 |
| Time to Gel (hr:min) | 2 hr 45 | 2 hr 50 min |
| BK3 TIME (min) | 73.22 | 82.67 |
| BK4 TIME (min) | 196.04 | 115.73 |
| COTTON TIME (min) | 30 min | 30 min |
| Appearance - WET | Clear | Clear |
| Appearance - DRY | Clear | Clear |
| water Spot-4 HR RT | 10 | 10 |
| SWELL RATIO | | |
| 1 DAY RT | 2.0 | 2.0 |
| 7 DAY RT | 1.8 | 1.8 |
| 30 DAY RT | 1.7 | 1.7 |
| GEL FRACTION | | |
| 30 DAY RT | 95.8 | 96.1 |
| PERSOZ HARD | | |
| 4 HR RT | 33 | 40 |
| 1 DAY RT | 116 | 123 |
| FISH HARDNESS | | |
| 1 DAY RT | 28.1 | 26.0 |
| 7 DAY RT | 90.0 | 78.0 |
| 30 DAY RT | 97.0 | 104.0 |

These results show that acrylics with segmented arms make excellent two component, isocyanate crosslinked coatings cured under ambient conditions. They show excellent early cure and final film properties.

Various modifications, alterations, additions or substitutions of the compositions and methods of this invention will be apparent to those skilled in the art without departing from the spirit and scope of this invention. This invention is not limited by the illustrative embodiments set forth herein, but rather is defined by the following claims.

What is claimed is:

1. A composition, comprising a graft copolymer having segmented arm(s), wherein the graft copolymer has a polymeric backbone and at least two polymeric segments that form the arms, said segments being grafted onto the backbone, wherein
   (a) the backbone is of polymerized ethylenically unsaturated monomers; and
   (b) the segmented arm(s) are of polymerized ethylenically unsaturated monomers that are attached to the backbone via a single point on the segmented arms, and wherein the at least two polymeric segments comprise differing compositions from those of adjacent segment(s), and
   (c) wherein the segmented arms are either: (i) block type segments formed from combinations of two monomers (AB) or three monomers (ABC) or (ii) tapered structure.

2. The composition of claim 1, wherein the graft copolymer has a weight average molecular weight of about 5,000-200,000.

3. The composition of claim 1, wherein the composition is used as a resin in an automotive topcoat composition.

4. The composition of claim 1, wherein the backbone is the same or similar to one of the segments on the arms or is entirely different.

5. The composition of claim 1 wherein the segmented arms(s) comprise macromonomer(s) having a segmented structure that are polymerized into the backbone via a single terminal ethylenically unsaturated group.

6. The composition of claim 1, wherein the adjacent segment(s) on the arms differ by: type of functional groups, concentration of functional groups, solubility, polarity, H-bonding capability, hardness, surface energy, and/or size or length of each segment.

7. The composition of claim 6, wherein the backbone is the same or similar to one of the segments on the arms or is entirely different.

8. The composition of claim 1 wherein the segmented arms comprise a relatively hard inner and a soft outer segment.

9. The composition of claim 8 wherein the segmented arms comprise a relatively hard inner segment and a soft outer segment and the outer segment contains at least one reactive or interactive functional group.

10. The composition of claim 9 wherein the backbone contain at least one reactive or interactive functional group which may be the same as or different from the functional group on the outer segment of the arm.

11. The composition of claim 1 wherein the segmented arms are provided with a hydrophilic outer segment and a hydrophobic inner segment and vice versa.

12. The composition of claim 11 wherein the segmented arms are provided with no functional groups on the inner segment and a reactive group in the outer segment.

13. The composition of claim 12, wherein the backbone is the same or similar to one of the segments on the arms or is entirely different.

14. The composition of claim 1, wherein the segmented arms are provided with at least one low surface energy segment.

15. The composition of claim 10, wherein the backbone has the same or similar composition to the outer segment of the arm(s).

16. The composition of claim 1 wherein the graft copolymer is formed primarily from (meth)acrylic monomers.

17. A graft copolymer of claim 1 produced by a macromonomer approach.

18. A graft copolymer of claim 1 produced by a living polymerization process.

19. A coating composition comprising the graft copolymer of claim 1.

20. The graft copolymer of claim 1 used to formulate coatings, inks, auto paints, house paints.

21. A coated substrate having coated end cured thereon a dried layer of the coating composition of claim 1.

22. The coated substrate of claim 21, wherein the substrate is comprised of plastic, wood, paper, or metal.

* * * * *